(12) United States Patent
Eymüller et al.

(10) Patent No.: US 6,949,042 B2
(45) Date of Patent: Sep. 27, 2005

(54) SHIFTABLE TRANSMISSION

(75) Inventors: Helmut Eymüller, Friedrichshafen (DE); Siegfried Stützle, Friedrichshafen (DE); Jürgen Legner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 50 days.

(21) Appl. No.: 10/476,271

(22) PCT Filed: Apr. 27, 2002

(86) PCT No.: PCT/EP02/04686
§ 371 (c)(1),
(2), (4) Date: Oct. 29, 2003

(87) PCT Pub. No.: WO02/090800
PCT Pub. Date: Nov. 14, 2002

(65) Prior Publication Data
US 2004/0121872 A1 Jun. 24, 2004

(30) Foreign Application Priority Data
May 3, 2001 (DE) ............................ 101 21 632

(51) Int. Cl.$^7$ ................................. F16H 31/00
(52) U.S. Cl. ................. 475/140; 475/143; 475/146; 475/320; 475/321; 475/322; 192/18 A; 192/48.8; 192/48.91; 192/87.11; 192/87.15; 192/87.16
(58) Field of Search .................. 475/140, 143, 475/146, 320, 321, 322; 192/18 A, 48.8, 48.91, 87.11, 87.15, 87.16

(56) References Cited
U.S. PATENT DOCUMENTS

| | | | |
|---|---|---|---|
| 3,970,176 A | * | 7/1976 | Bucksch .................. 192/87.11 |
| 4,010,833 A | * | 3/1977 | Brendel et al. .......... 192/87.11 |
| 4,516,444 A | | 5/1985 | Herr, Jr. .................... 74/781 R |
| 5,024,636 A | * | 6/1991 | Phebus et al. .............. 475/141 |
| 5,151,068 A | * | 9/1992 | Mann et al. ................. 475/322 |
| 5,306,215 A | * | 4/1994 | Mann et al. ................... 475/83 |
| 5,462,147 A | * | 10/1995 | Sherman .................... 192/18 A |
| 5,509,860 A | * | 4/1996 | Legner ....................... 475/129 |
| 5,700,220 A | * | 12/1997 | Legner ....................... 475/129 |
| 6,685,595 B2 | * | 2/2004 | Ohkubo et al. ............. 475/319 |
| 6,824,494 B2 | * | 11/2004 | Yasuda et al. .............. 475/327 |

FOREIGN PATENT DOCUMENTS

| | | | |
|---|---|---|---|
| DE | 2 016 712 | 10/1971 | .......... B60K/17/02 |
| DE | 27 32 121 | 1/1978 | ........... F16H/5/18 |
| DE | 28 41 053 | 4/1980 | ........... F16H/5/12 |
| EP | 0 408 592 B1 | 1/1992 | ........... F16H/3/54 |
| EP | 0 466 742 B1 | 7/1993 | .......... F16H/61/12 |
| EP | 0 659 250 B1 | 7/1996 | .......... F16H/61/06 |
| EP | 0 745 199 B1 | 8/1998 | .......... F16H/61/06 |
| FR | 1.346.946 | 11/1963 | |
| FR | 2 535 810 | 5/1984 | ........... F16H/3/74 |
| WO | 89/08796 | 9/1989 | ........... F16H/3/54 |
| WO | 91/00443 | 1/1991 | ........... F16H/3/70 |

* cited by examiner

Primary Examiner—Sherry Estremsky
Assistant Examiner—David D. Le
(74) Attorney, Agent, or Firm—Davis & Bujold, P.L.L.C.

(57) ABSTRACT

A shiftable transmission in which at least two clutches (2, 7) actuated in closing direction by spring force and in opening direction by the exertion of pressure are arranged, wherein output of the transmission is stopped by unpressurized shifting of both actuation devices (9, 13) thereby closing both clutches (2, 7). When pressure is exerted upon the second actuation device (13), the actuation force of the first actuation device (9) is composed of a spring force of the first actuation device (9) and a hydraulic force from the pressurization of the second actuation device (13). The clutch belonging to the first actuation device can thus be impinged upon with different forces depending on whether or not the second actuation device is impinged upon with pressure.

7 Claims, 1 Drawing Sheet

SHIFTABLE TRANSMISSION

This application is a national stage completion of PCT/EP02/04686 filed Apr. 27, 2002 which claims priority from German Application Ser. No. 101 21 632.7 filed May 3, 2001.

FIELD OF THE INVENTION

The invention relates to a shiftable transmission.

BACKGROUND OF THE INVENTION

According to their nature shiftable transmissions are used particularly in mobile excavators, loaders and similar machinery. The individual gear steps of the mechanical transmission are alternatively engageable and disengageable via respective friction clutches. At least two of the friction clutches are designed as spring accumulator clutches and can be controlled in an opening direction by oil pressure produced by a pressure medium source. A friction clutch is preferably designed as a brake and has a static oil supply free of oil leakage.

Such a shiftable transmission has been disclosed in EP 0 408 592 B1 where a first actuation device can be actuated by pressurization in an opening direction and in a closing direction by unpressurized shifting, via a spring force, and a second actuation device can be actuated by pressurization in an opening direction and in a closing direction by unpressurized shifting, via a spring force, both actuation devices being disposed coaxially to each other. If both actuation devices are shifted without pressure and both clutches are closed, the output of the transmission is blocked, whereby a parking brake position is attained. The spring force of the first actuation device is laid out so that the clutch, belonging to the second actuation device, can transmit the needed torque. If the parking brake is engaged while the output of the transmission is rotating, that is, when the vehicle is moving, then the fist and second actuation devices are shifted without pressure whereby both clutches are actuated in closing direction by the spring force. This is also attained when, due to a defect, the pressure medium source cannot deliver the needed pressure level or the pressure medium supplies have been damaged. Since the spring forces of the actuation devices are laid out so that they can transmit the needed torques, there is obtained in such a deceleration too great a delay whereby the vehicle can encounter uncontrolled situations.

EP 0 466 742 B1 discloses a shiftable transmission in which two clutches can be actuated by pressurization of the actuation devices in an opening direction and by unpressurized shifting of the actuation devices in a closing direction in which case, when both actuation devices are shifted without pressure, the output of the transmission can be decelerated, a pressure medium source additionally supplying an accumulator with pressure medium which, in case of such deceleration, supplies a first actuation device with pressure medium until the transmission has decelerated the vehicle under control. Such a supply of the actuation devices with pressure medium is very wasteful and expensive. Since in said transmission only one actuation device has one static oil supply and the oil supply to the second actuation device is carried out dynamically, it is necessary to ensure that, in case of an emergency deceleration, the accumulator is always connected with the first actuation device. Due to the arrangement in a transmission of a static and a dynamic pressure medium supply, the transmission has considerably more parts and places to seal.

EP 0 659 250 B1 and EP 0 745 199 B1 disclose a shiftable transmission with spring accumulator deceleration in which the actuation devices can be pressurized via a throttle recoil valve whereby the actuation devices can be actuated quickly in opening direction, but the closing operation develops slowly. It is hereby ensured that one clutch always opens precisely before the second clutch is closed.

The problem on which this invention is based is to provide a shiftable transmission which stands out by a simple construction of the actuation devices and eliminates expensive hydraulic controls.

SUMMARY OF THE INVENTION

According to the invention, the shiftable transmission has at least two actuation devices which can be operated by pressurization in an opening direction and by unpressurized shifting via one spring in a closing direction. The actuation devices are disposed so that a first actuation device in pressureless state actuates a brake in the closing direction via a spring force. At the same time, if a second actuation device is operated in the opening direction against a spring force, then the spring force of the first actuation device acts upon the first actuation device and additionally, a hydraulic force from the pressurization of the second actuation device. If the first actuation device is pressurized and the second actuation device is shifted without pressure, then the spring of the second actuation device actuates it in the closing direction. If both actuation devices are shifted without pressure, which corresponds to an emergency operation, then only the spring force of the first actuation device acts upon the first actuation device and upon the second actuation device the spring force of the second actuation device. It is thus possible to lay out the spring force of the first actuation device so that the dynamic deceleration of the vehicle develops under control and the transmissible torque needed during shifting of a gear can be transmitted via the first actuation device, since, in this case, the hydraulic force of the second actuation device is added to the spring force. The first actuation device preferably consists of one piston actuated via a spring and situated in the housing of the transmission, which housing of the transmission forms one part of the cylinder of the actuation device whereby a static oil supply is obtained. The piston of the second actuation device is disposed coaxially to the piston of the first actuation device, the piston of the first actuation device forming the cylinder of the second actuation device. The pressure medium supply to the piston of the second actuation device is preferably situated through the piston of the first actuation device whereby the second actuation device also has a static pressure medium supply. The spring force of the second actuation device is preferably laid out so that during a dynamic emergency deceleration, that is, during unpressurized shifting of both actuation devices, the clutch belonging to the second actuation device is closed so that during the dynamic deceleration the discs of the clutch have no differential speed and the dynamic deceleration takes place via a decreasing differential speed of the clutch belonging to the first actuation device. The clutch of the first actuation device is preferably situated radially outside the clutch of the second actuation device whereby a good dissipation of heat and thermal capacity are obtained due to the radially large discs. The actuation devices and the clutches belonging thereto are preferably arranged axially in the same area.

A small length of the transmission is obtained by arranging the clutches and brakes and the actuation devices axially in the same area. By the piston of the second actuation device being situated within the piston of the first actuation device and the piston of the first actuation device forming the cylinder for the piston of the second actuation device, a compact design of the actuation devices is possible and by the pressure medium supply to the piston of the second actuation device being passed through the piston of the first actuation device, both the first actuation device and the second actuation device can be laid out with a static oil supply. By the fact that during unpressurized shifting of the first actuation device and pressurizing of the second actuation device, the spring force of the first actuation device and the hydraulic force of the second actuation device act upon the clutch of the first actuation device, it is possible in the gear engaged to transmit enough torque and during an emergency deceleration, that is, during unpressurized shifting of both actuation devices, to decelerate the vehicle with control. No expensive accumulators and control devices are thus needed. Likewise, the installation space for the spring of the first actuation device is reduced since the spring force is diminished. By the spring of the second actuation device being laid out so that during an emergency deceleration the clutch belonging to the second actuation device has no differential speed and the dynamic deceleration results via the clutch belonging to the first actuation device, the latter, however, being disposed radially outside the clutch belonging to the second actuation device, a sufficient dissipation of heat is ensured. If the gears in the transmission are arranged so that the first gear is shifted when the clutch belonging to the first actuation device is closed and the second gear is shifted when the clutch belonging to the second actuation device is closed, it is ensured that during an emergency deceleration the second gear is always shifted whereby, during an emergency deceleration from the second gear, no inadmissible deceleration occurs in the first gear since, in this gear, the delay would be too long.

BRIEF DESCRIPTION OF THE DRAWING

The invention will now be described, by way of example, with reference to the accompanying drawings in which.

DETAILED DESCRIPTION OF THE INVENTION

Figure 1:
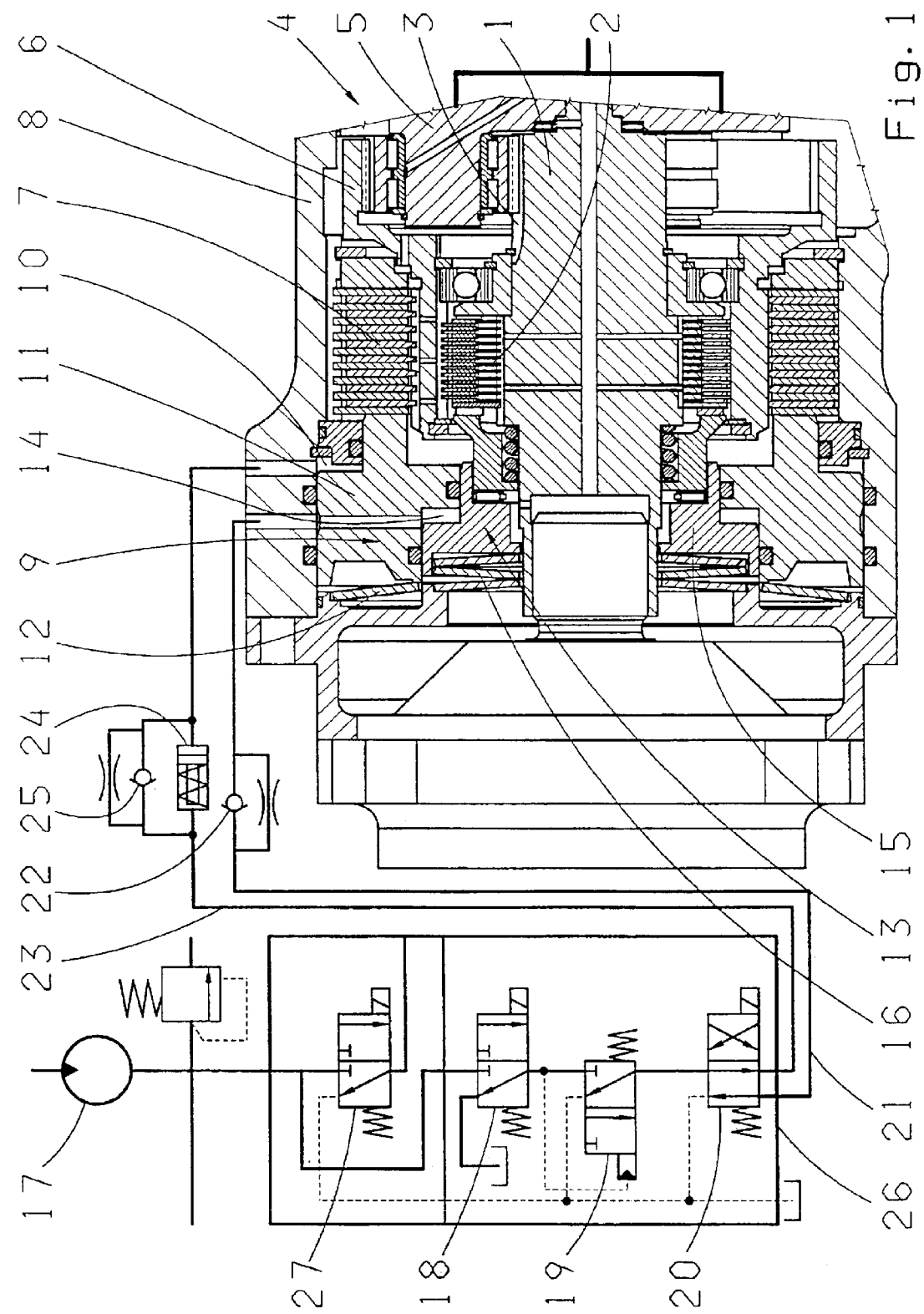
FIG. 1 shows a section from a shiftable two-way transmission with appertaining hydraulic control.

The single FIGURE shows a section from a shiftable two-way transmission with appertaining hydraulic control. A prime mover (not shown) drives an input shaft 1. The prime mover can be an internal combustion engine or a hydrostatic or electric motor. The input shaft 1 is connected on one side with discs of a clutch 2 and, on the other side, with an inner central gear 3 of a planetary transmission 4; A planet carrier 5 of the planetary transmission 4 forms the output of the transmission and an outer central gear 6 is connected on one side with discs of the clutch 2 and, on the other side, with discs of a brake 7. The outer discs of the brake 7 are connected with a housing 8 and the inner discs of the brake 7 are connected with the outer central gear 6. A first actuation device 9 is actuated in opening direction by pressure medium in a space 10 moving a piston 11 against the force of a spring 12. The piston 11 of the first actuation device 9 is actuated in a closing direction by the space 10 being shifted without pressure and the force of the spring 12 pressing the piston toward the brake 7. A second actuation device 13 is actuated in an opening direction by pressure medium being passed through the piston 11 into a space 14 and moving a piston 15 against the force of a spring 16. If the space 14 is pressureless, then the piston 15 is pressed by the force of the spring 16 toward the clutch 2. The first gear of the transmission is engaged by a pressure medium source 17 which, in a hydrostatic drive, can also be the feed pump of the hydrostatic drive, passing pressure medium to a parking brake valve 18 and from there conveying it, via a pressure fusing valve 19 to a gear selector valve 20; In the first gear, the gear selector valve is reversed to the left against the spring force whereby pressure medium arrives at a pipe 21 and via a throttle recoil valve 22 through the piston 11 at the space 14. Thereby the clutch 2 is opened. At the same time, via a pipe 23, pressure medium from the space 10 and an accumulator 24 is passed via a throttle recoil valve 25 and the gear selector valve 20 into the pressure medium tank. The piston 11 thus moves, by the force of the spring 12 and the pressure in the space 14, toward the brake 7 closing it. The piston 11 thus presses, with a summation of the force of the spring 12 and the hydraulic force, upon the discs of the brake 7. The force of the spring 12 and the surface in the space 14 are laid out so that the brake 7 can transmit the needed torque. If the second gear is shifted, the gear selector valve 20 is reversed whereby the hydraulic pressure arrives via the pipe 23 at the space 10 and moves the piston 11 against the force of the spring 12. The brake 7 is thus opened. At the same time the pressure medium from the space 14 is removed via the throttle recoil valve 22 and the piston 21 to the pressure medium tank. The piston 15 closes the clutch 2 aided by the force of the spring 16. At the same time, the accumulator 24 is again filled with pressure medium in order to obtain a very good situation during a downshift such as described in EP 0 659 250 B1. If an emergency deceleration is introduced, which can occur, for example, due to a defect in the pressure medium source 17 or to manual reversal of the parking brake valve 18 or a reversal of the pressure fusing valve 19, then the pipe 21 and the pipe 23 are unpressurized. This can also occur, for example, due to breaking of both pipes. If the pipes 21 and 23 are pressureless, the pressure in the spaces 14 and 10 breaks down via the throttle recoil valves 22 and 25 whereby the pistons 11 and 15 close the clutch 2 and the brake 7. Since the piston 11 acts only on the force of the spring 12, but the latter is laid out so that the torque needed for the gear is obtained in the pressurized space 14 only by the sum of the force of the spring 12 and of the hydraulic force, the vehicle is decelerated under control due to the low contact force upon the brake 7. The deceleration is obtained exclusively via a differential speed of the discs in the brake 7, since the force of the spring 16 is laid out so that the discs of the clutch 2 have no differential speed. It is thus possible to absorb the heat produced by the brake 7. For different vehicles, if diverse brake torques are required due to different weights, the brake torque can be changed by changing the forces of the springs 12 or changing the number of discs of the brake 7. Because of the simple control of the transmission, it is possible to attach or integrate in the transmission housing the valve block 26, the same as the accumulator 24 and the throttle recoil valves 22 and 24 with the result of a compact, maintenance-free arrangement. A front axle disconnection 27 can also be situated in a valve block 26. It is also possible to carry out the change of gear without interruption of the traction force. It is possible under pressure modulation to close the clutch 2 and the brake 7 via proportional valves. The modulation results through pressure-regulating valves which are located on the transmission and controlled via aircraft electronics or an electronic system fastened on the transmission. In order that the vehicle can be towed in case of a defect in which the spaces 14 and 10 are filled with pressure medium but pressureless and thus the clutch 2 and the brake 7 are closed, it is possible via an external pressure medium supply to actuate the actuation devices in opening direction.

The supply to the space 14 is here shut and via a pressure medium supply pressure medium is introduced in the space 10. Since the pressure medium in the space 14 cannot escape, the piston 15 is actuated, likewise, in an opening direction by the movement of the piston 11, only the pressure medium volume for the space 10 being made available by the pressure medium supply. The pressure medium supply for said actuation can thus be made smaller.

REFERENCE NUMERALS 1 input shaft gear
2 clutch
3 inner central
4 planetary transmission
5 planet carrier
6 outer central gear
7 brake
8 housing
9 first actuation device
10 space
11 piston
12 spring
13 second actuation device
14 space
15 piston
16 spring
17 pressure medium source
18 parking brake valve
19 pressure fusing valve
20 gear selector valve
21 pipe
22 throttle recoil valve
23 pipe
24 accumulator
25 throttle recoil valve
26 valve block
27 front axle disconnection

What is claimed is:

1. A shiftable transmission having at least two gears, the shiftable transmission comprising:

a first actuation device (9) actuatable in a closing direction by force of a first spring (12) and actuatable in an opening direction and by pressurization;

a second actuation device (13) actuatable in a closing direction by force of a second spring (16) and actuatable in an opening direction and by pressurization;

a first gear which is shiftable by actuation of said first actuation device (9) in the closing direction and by actuation of the second actuation device (13) in the opening direction;

a second gear which is shiftable by actuation of said second actuation device (13) in the closing direction and by actuation of said first actuation device (9) in the opening direction;

where an output of the transmission is decelerated when said first and second actuation devices (9, 13) are actuated in the closing direction, and the spring force of said first spring (12) actuating exclusively upon said first actuation device (9) and the spring force of said second spring (16) actuating exclusively upon said second actuation device (13);

wherein when the first gear is shifted, the actuation force of said first actuation device (9) is formed by the spring force of said first spring (12) and by a pressure medium resulting from the pressurization of said second actuation device (13);

a piston (11) of said first actuation device (9) is disposed coaxially with a piston (15) of said second actuation device (13) and said piston (11) of said first actuation device (9) forms a cylinder for said piston (15) of said second actuation device (13); and the pressure medium is supplied to said second actuation device (13) through said piston (11) of said first actuation device (9).

2. The shiftable transmission according to claim 1, wherein when said second gear is shifted, the actuation force of said second actuation device (13) actuated in the closing direction is formed exclusively by the spring force of said second actuation device (13).

3. The shiftable transmission according to claim 1, wherein said first and second actuation devices (9, 13) act upon multi-disc clutches (2, 7).

4. The shiftable transmission according to claim 1, wherein the spring forces of said first and second actuation devices (9, 13) are arranged so that during rotation of said output and unpressurized shifting of both of said first and second actuation devices (9, 13) one radially outer clutch (7) decelerates said output via a decreasing differential speed of the discs of said clutch (7) and discs of a radially inner clutch have no differential speed during the deceleration.

5. The shiftable transmission according to claim 1, wherein said first and second actuation devices (9, 13) can be actuated in the opening direction by shutting off the supply of the pressure medium to said second actuation device (13) and pressurizing said first actuation device (9).

6. The shiftable transmission according to claim 1, wherein the pressure medium, supplied from a pressure source (17), can be connected with one of said first actuation device (9) and said second actuation device (13), and the pressure medium from the pressure source (17) is connected with said first actuation device (9) via a gear selector valve (20), an accumulator (24) and a throttle recoil valve (25), and the pressure medium from the pressure source (17) is connected with the second actuation device (13) via the gear selector valve (20) and a throttle recoil valve (22).

7. The shiftable transmission according to claim 6, wherein between said pressure source (17) and said gear selector valve (20), a pressure fusing valve (19) and a parking brake valve (18) are situated, and said pressure fusing valve (19) and said parking brake valve (18) either providing a connection between said gear selector valve (20) and said pressure source or providing a disconnection between said gear selector valve (20) and said pressure source.

* * * * *